United States Patent
Wang et al.

(10) Patent No.: US 11,633,711 B2
(45) Date of Patent: Apr. 25, 2023

(54) PREPARATION METHOD OF LA(OH)$_3$ NANOROD COATED WALNUT SHELL BIOCHAR COMPOSITE

(71) Applicant: AGRO-ENVIRONMENTAL PROTECTION INSTITUTE, MINISTRY OF AGRICULTURE AND RURAL AFFAIRS, Tianjin (CN)

(72) Inventors: Feng Wang, Tianjin (CN); Yuan Luo, Tianjin (CN); Keqiang Zhang, Tianjin (CN)

(73) Assignee: AGRO-ENVIRONMENTAL PROTECTION INSTITUTE, MINISTRY OF AGRICULTURE AND RURAL AFFAIRS, Tianjin (CN)

( * ) Notice: Subject to any disclaimer, the term of this patent is extended or adjusted under 35 U.S.C. 154(b) by 230 days.

(21) Appl. No.: 17/127,717

(22) Filed: Dec. 18, 2020

(65) Prior Publication Data
US 2021/0213415 A1    Jul. 15, 2021

(30) Foreign Application Priority Data
Jan. 13, 2020    (CN) .......................... 202010030164.4

(51) Int. Cl.
*B01J 20/20*    (2006.01)
*B01J 20/02*    (2006.01)
(Continued)

(52) U.S. Cl.
CPC ........... *B01J 20/0207* (2013.01); *B01J 20/20* (2013.01); *B01J 20/28007* (2013.01);
(Continued)

(58) Field of Classification Search
None
See application file for complete search history.

(56) References Cited

U.S. PATENT DOCUMENTS

2021/0331149 A1 * 10/2021 Zhang ..................... B01J 23/22
2022/0126267 A1 *  4/2022 Luo ......................... C02F 1/288

FOREIGN PATENT DOCUMENTS

CN    106219544 A  * 12/2016 .......... C01P 2004/61
CN    109759017 A  *  5/2019 .............. B01J 20/20

OTHER PUBLICATIONS

DERWENT-ACC-No. 2016-802929 for CN 106219544 A. "Preparing wood activated carbon containing lanthanum comprises e.g. mixing lanthanum compound, alkaline earth metal compound and plant material powder, carrying out carbonization of obtained mixture, and post-processing." Dec. 14, 2016.*

(Continued)

*Primary Examiner* — Joseph D Anthony
(74) *Attorney, Agent, or Firm* — Daniel M. Cohn; Howard M. Cohn

(57) ABSTRACT

The present invention relates to a preparation method of La(OH)$_3$ nanorod/walnut shell biochar composite material (LN-WB), comprising the following steps: putting walnut shell powder into a crucible and pyrolyzing and carbonizing in a muffle furnace at 350° C. to 450° C.; after the pyrolysis is completed, grinding and sieving the obtained biochar, and then repeatedly washing with deionized water; drying the washed biochar for later use; putting an appropriate amount of biochar into the deionized water to form a turbid solution; simultaneously dropwise adding LaCl$_3$ and NaOH to the above turbid solution by using a peristaltic pump; and allowing the obtained mixture to stand at room temperature for 20 to 30 h, washing and drying for later use. The present invention successfully prepares a La(OH)$_3$ nanoparticle-loaded biochar composite material through a simple synthesis technology.

6 Claims, 10 Drawing Sheets

(51) Int. Cl.
*B01J 20/30* (2006.01)
*B01J 20/28* (2006.01)
*C02F 1/28* (2023.01)
*C02F 101/10* (2006.01)

(52) U.S. Cl.
CPC ....... *B01J 20/3021* (2013.01); *B01J 20/3071* (2013.01); *B01J 20/3078* (2013.01); *B01J 20/3085* (2013.01); *C02F 1/281* (2013.01); *C02F 1/283* (2013.01); *C02F 1/288* (2013.01); *C02F 2101/105* (2013.01); *C02F 2305/08* (2013.01)

(56) References Cited

OTHER PUBLICATIONS

DERWENT-ACC-No. 2019-465060 for CN 109759017 A, "Preparing modified bio-char comprises taking walnut shell, strong acid and strong alkali as raw material, pre-treating walnut shell, carrying out oxygen barrier carbonization, acid modification, base modification, washing and drying." May 17, 2019.*

* cited by examiner

PREPARATION METHOD OF LA(OH)$_3$ NANOROD COATED WALNUT SHELL BIOCHAR COMPOSITE

CROSS REFERENCE TO RELATED APPLICATIONS

This application claims priority to Chinese Patent Application No. 202010030164.4 filed Jan. 13, 2020 and entitled "Preparation Method of LA(OH)$_3$ Nanorod/Walnut Shell Biochar Composite Material," the entire disclosure of which is incorporated herein by this reference.

TECHNICAL FIELD

The present invention belongs to the field of environmental protection, relates to a technology of phosphorus removal from water, and particularly relates to a preparation method of La(OH)$_3$ nanorod/walnut shell biochar composite material.

BACKGROUND OF THE PRESENT INVENTION

Phosphorus is an essential element for plant growth, but excessive phosphorus discharged into the water may cause eutrophication, thereby causing rapid propagation of algae and other plankton, reducing the dissolved oxygen level of the water, deteriorating the water quality and endangering the aquatic environment. It is generally believed that the eutrophication of the water is mainly caused by excessive nitrogen and phosphorus emissions, and phosphorus is a dominant factor. In various physical, chemical, and biological dephosphorization methods, the adsorption method is considered as an economical, efficient and easy-to-operate dephosphorization method. However, how to select appropriate adsorption material is the key to its application. Therefore, phosphate adsorption materials with low cost and high adsorption performance attract extensive study interest.

Biochar is a carbon-rich substance obtained through the pyrolysis conversion of biomass under anoxic conditions, and has the characteristics of simple preparation, wide sources, low cost and application in soil improvement after adsorbing phosphorus. Therefore, it has outstanding advantages in terms of production cost and final treatment compared with industrial by-products, natural minerals, clay and artificial synthetic materials. However, conventional biochar generally has a low isoelectric point, is easy to show negative electricity in the solution, and can form electrostatic repulsion with phosphate ions, which is not conducive to the adsorption of phosphorus. Meanwhile, the biochar has limited active sites for adsorbing phosphorus, and relatively weak adsorption capacity of the phosphorus. The biochar will even release the phosphorus carried by it into the solution, resulting in the increase of the phosphorus concentration. However, the study shows that La has strong affinity for phosphate and can form a stable chemical bond with $PO_4^{3-}$. The produced substances are less affected by factors such as pH and redox potential. Meanwhile, La can also be used as a rare earth fertilizer, which is conducive to increasing crop yield.

However, when the La-containing reagent is directly used for phosphate removal, the problems of low La utilization rate and difficult recovery are easily caused. Therefore, the characteristics of the biochar and La can be fully utilized, and the biochar can be used as a carrier, so that La active components can be uniformly loaded on the surface of the biochar. The adsorption capacity of the biochar for the phosphorus is enhanced, and the utilization efficiency of La in phosphate removal is also increased.

In the previous studies, the link of loading La by the biochar is mainly realized by dripping alkali into the La-containing solution or dripping La into the alkali-containing solution. Since high concentration of alkali and high concentration of La solution are often used in the preparation process, this mode may cause local alkali or La content to be too high, causing that large particles of La(OH)$_3$ are formed and the La(OH)$_3$ particle system loaded on the surface of the biochar is not uniform, thereby resulting in the decrease of the utilization efficiency of La when the phosphorus is adsorbed by the material.

SUMMARY OF PRESENT INVENTION

The purpose of the present invention is to overcome the defects of the prior art, so as to provide a preparation method of La(OH)$_3$ nanorod coated walnut shell adsorbing material. Biochar adsorption capacity can be increased to 75.08 mg/g, and the molar ratio of phosphorus/lanthanum (P/La) is 1.27. The present invention adopts the following technical solution for solving the technical problems.

A preparation method of La(OH)$_3$ nanorod/walnut shell adsorbing material comprises the following steps:

(1) putting walnut shell powder into a crucible and pyrolyzing and carbonizing in a muffle furnace at 350° C. to 450° C.;

(2) after the pyrolysis is completed, grinding and sieving the obtained biochar, and then repeatedly washing with deionized water;

(3) drying the washed biochar for later use;

(4) putting an appropriate amount of biochar into the deionized water to form a turbid solution;

(5) simultaneously dropwise adding LaCl$_3$ and NaOH to the above turbid solution by using a peristaltic pump;

(6) allowing the obtained mixture to stand at room temperature for 20 to 30 h, washing and drying for later use.

Moreover, the concentration of the LaCl$_3$ solution is 0.3-0.6 mol/L, and the concentration of the NaOH solution is 1.0-2.0 mol/L.

Moreover, the pyrolysis and carbonization time is 1-3 h.

Moreover, the drying temperature in the step (3) is 100 to 110° C.

Moreover, the mass percentage of the biochar in the step (4) is 9% to 10%.

Moreover, the dripping speed of LaCl$_3$ and NaOH solutions in the step (5) is 1.5-2.0 mL/min.

The advantages and positive effects of the present invention are as follows:

1. Compared with a hydrothermal method and a tube furnace pyrolysis method, the present invention adopts a pyrolysis method to treat walnut shell powder, and is sampler in design, simpler in operation and easier to obtain a large amount of biochar.

2. In the present invention, La and an alkaline solution are added dropwise in the same container under stirring. In the dripping process, the dripping speed is adjusted by the peristaltic pump. In this way, the problems of uneven particle size and low metal utilization efficiency due to over-high local concentration of the alkaline solution can be avoided.

3. The present invention successfully prepares a La(OH)$_3$ nanoparticle-loaded biochar composite through a simple synthesis technology. The content of La in La(OH)$_3$ nanorod coated walnut shell biochar composite (LN-WB) is 26.59%;

the maximum adsorption capacity of Lanmuir is 75.08 mg/g; and the molar ratio of P/La is 1.27. The present invention has outstanding advantages compared with similar La-based adsorbing materials. The phosphorus adsorption capacity of the material is higher than 55 mg/g within the initial pH range 3-11 of the phosphorus solution, and the recovery rate of La in the material is higher than 90%. After the phosphate is adsorbed, the pH range of the solution is changed from 3-11 to 7.4-10.1. The material can be used to remove the phosphate in the water without adjusting the initial pH of the solution.

DETAILED DESCRIPTION OF PREFERRED EMBODIMENTS

Figure 1:
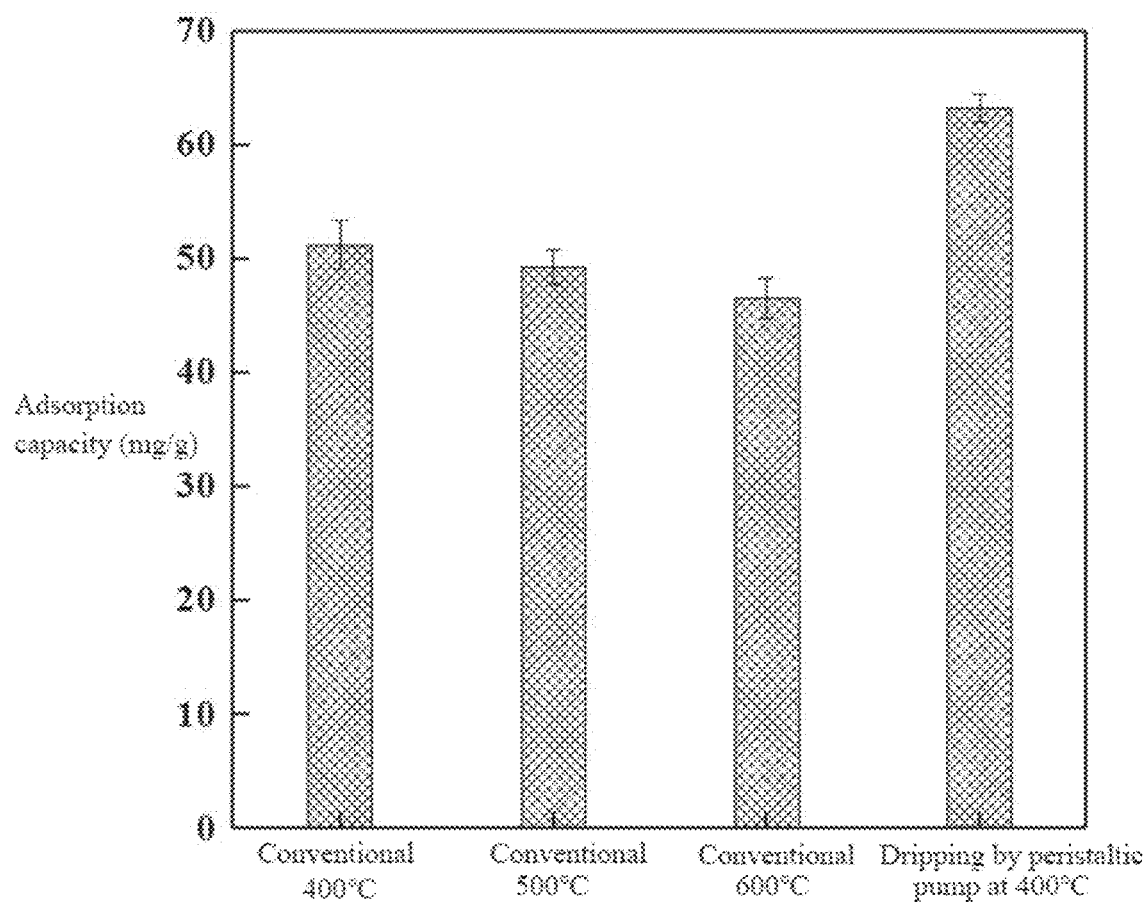
FIG. 1 is a comparison diagram of adsorption capacity of La(OH nanorod coated walnut shell biochar composite (LN-WB) prepared under different conditions.

The present invention is further described below in detail through specific embodiments. The following embodiments are only descriptive, not restrictive, and cannot be used to limit the protection scope of the present invention.

Embodiment 1

A preparation method of La(OH)$_3$ nanorod/walnut shell adsorbing material comprises the following steps:

1. Preparation of Biochar WB (1) The walnut shell powder is transferred into the crucible; the crucible is transferred into a box muffle furnace; and then the heating rate of the box muffle furnace is adjusted to 5° C./min, the pyrolysis time is adjusted to 2 h, and final pyrolysis temperature is 400° C. for carbonization.

(2) After the pyrolysis is completed, when the temperature in the furnace is lower than 100° C., the crucible is taken out and cooled, and the biochar is ground and sieved through a 60-mesh sieve tray. Then, the biochar is repeatedly washed with deionized water for three times.

(3) The washed biochar sample is dried in an oven of 105° C. for later use.

2. Preparation of LN-WB (1) 10 g of WB is accurately weighed and transferred into a 500 mL beaker, and 100 mL of deionized water is added to form a turbid solution.

(2) A peristaltic pump is used to simultaneously dropwise add 100 mL of LaCl$_3$ and NaOH to the above turbid solution. The concentration of the LaCl$_3$ solution is 0.5 mol/L; the concentration of the NaOH solution is 1.6 mol/L; and the flow rate of the peristaltic pump is about 2 min/L.

(3) The obtained mixture stands at room temperature for 24 h; the biochar is washed with pure water for 3 times by vacuum suction filtration; and the obtained sample is dried at 80° C. for later use.

TABLE 1

Biochar Yield and La Content

| WB Sample | LN-WB | |
|---|---|---|
| productivity (%) | Sample yield (g) | La content (wt %) |
| 34.59 ± 1.33 | 19.41 ± 0.09 | 26.59 ± 1.21 |

Reference Example 1

It is different from embodiment 1 in that:

In the preparation step (2) of LN-WB, 100 mL of 0.5 mol/L LaCl$_3$ solution is added to a beaker, and stirred vigorously with a glass rod for 1-2 min. Then, 100 mL of 1.6 mol/L NaOH is added dropwise to the mixed solution. In the dripping process, the solution is continuously stirred with the glass rod to uniformly mix the solution.

Reference Example 2

It is different from reference example 1 in that: the pyrolysis temperature is 500° C.

Reference Example 3

It is different from reference example 1 in that: the pyrolysis temperature is 600° C.

Test of Phosphorus Adsorption by Biochar 0.1 g of La(OH)$_3$ modified biochar is weighed, and a phosphorus solution is 100 mL has a concentration of 100 mg/L. An adsorption reaction is performed in a shaker at 120 rpm and 25° C. for 48 h. The supernatant is filtered through a 0.45-micron filter membrane to determine the TP concentration. The results are as follows.

TABLE 2

Comparison of Adsorption Capacity

| Reference example 1 Adsorption capacity of conventional dripping at 400° C.(mg/g) | Reference example 2 Adsorption capacity of conventional dripping at 500° C.(mg/g) | Reference example 3 Adsorption capacity of conventional dripping at 600° C. (mg/g) | Embodiment 1 Adsorption capacity of 400° C. biochar by dripping with peristaltic pump (mg/g) |
|---|---|---|---|
| 53.25 ± 2.1 | 49.23 ± 1.5 | 46.56 ± 1.8 | 63.27 ± 1.2 |

The biochar prepared by the method of embodiment 1 is represented as follows.

1. Analysis of Physical and Chemical Properties of Biochar

Figure 2:
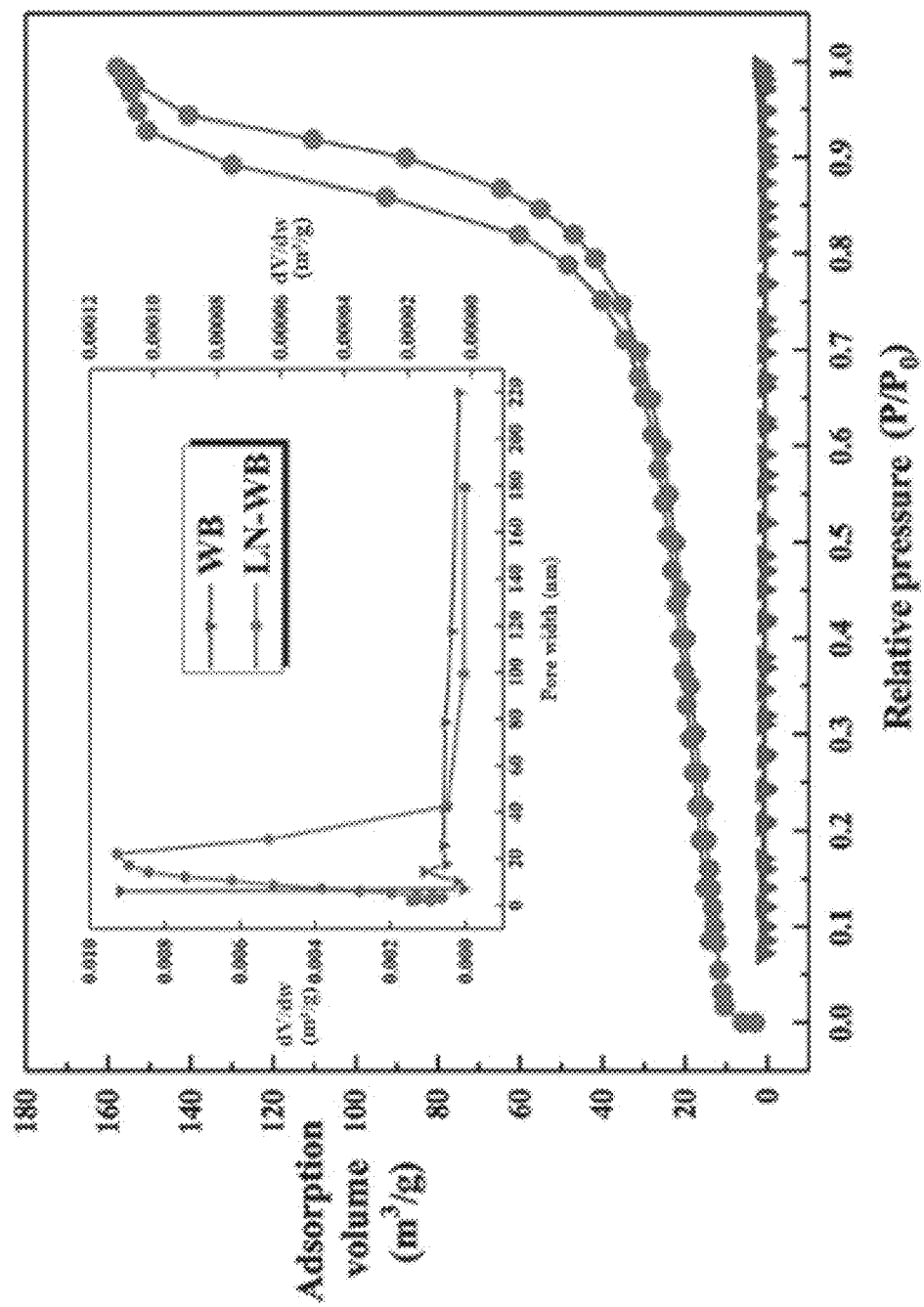
FIG. 2 shows adsorption-desorption isotherms and pore size distribution of walnut shell biochar (WB) and LN-WB $N_2$.
Figure 3:
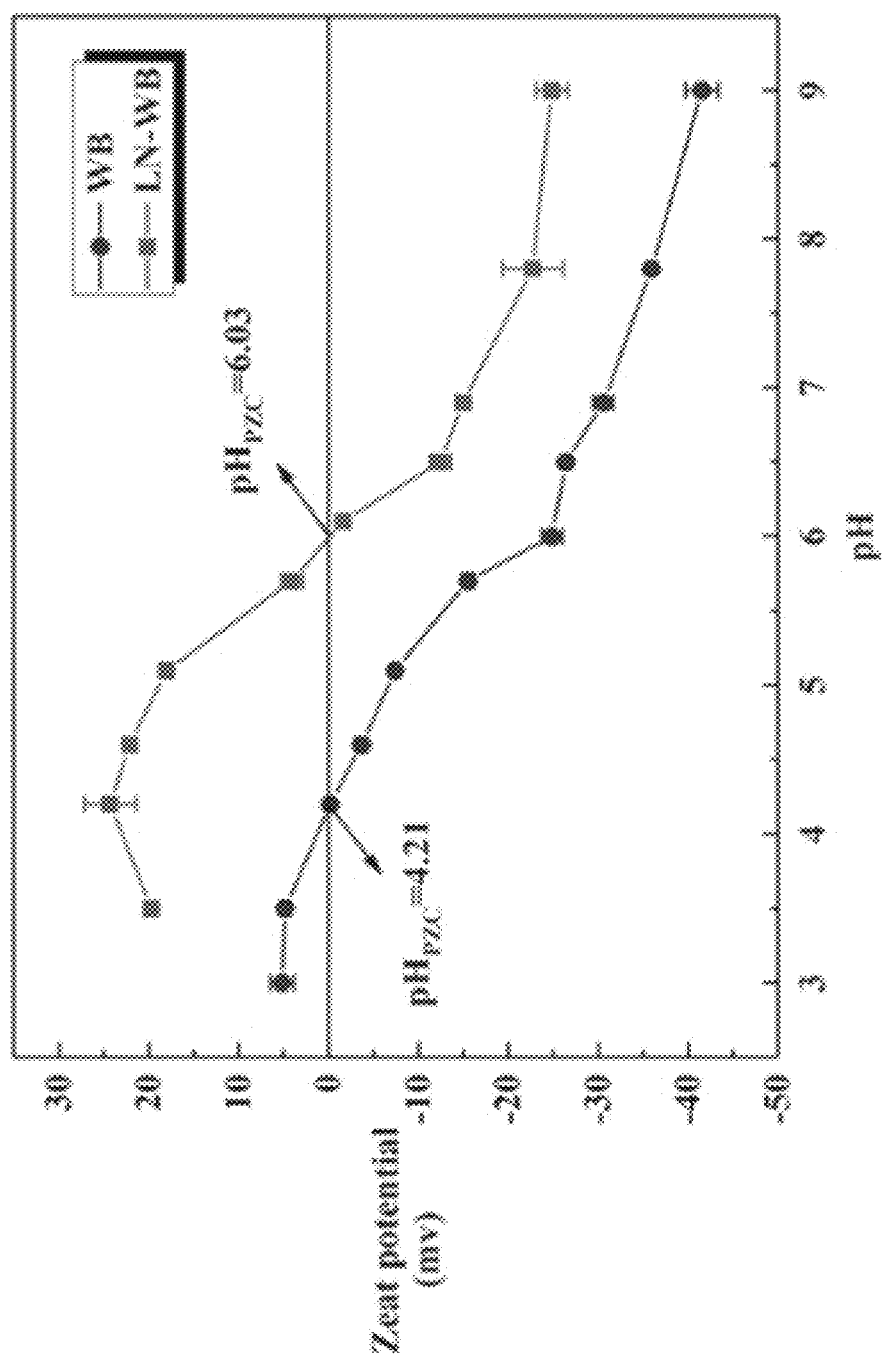
FIG. 3 shows zeta potential distribution of WB and LN-WB.

Table 2 shows the C, H, O and N contents, BET specific surface area, pore volume, pore size and isopotential points of WB and LN-WB. According to Table 3, after $La(OH)_3$ is loaded, the content of element O is slightly increased, and the contents of other elements are decreased. The content of element O is increased because the total mass is increased but the content (25.28%) of element O in $La(OH)_3$ is higher than the content of element O in WB. The content of element H is decreased because the total mass is increased but the content (1.58%) of element H in $La(OH)_3$ is lower than the content of element H in WB. The contents of other elements are decreased only because the total mass is increased. FIG. 2 shows the adsorption-desorption curves of WB and LN-WB for $N_2$. The $S_{BET}$ of WB is 2.77 m$^2$/g; the pore volume calculated by BJH is 0.0020 m$^3$/g; and the average pore diameter is 62.796 nm. After $La(OH)_3$ is loaded, the specific surface area is 50.6009 m$^2$/g, the pore volume is 0.2362 m$^3$/g, and the average pore diameter is 16.8557 nm. The surface area of the biochar is increased sharply after $La(OH)_3$ is loaded, which may be because $La(OH)_3$ forms rich microporous systems on the surface of the biochar. In addition, the isoelectric point ($pH_{PZC}$) of WB is 4.6, and $pH_{PZC}$ of LN-WB is 6.03. It is shown that loading of $La(OH)_3$ can increase the isoelectric point of original biochar. FIG. 3 shows the change of the Zeta potentials of WB and LN-WB with the increase of pH.

from the O—H stretching vibration in $La(OH)_3$. The adsorption peaks at the wave numbers of 1496 cm$^{-1}$ and 1380 cm$^{-1}$ of the second ellipse are derived from the stretching vibration of C—O in $CO_3^{2-}$. The adsorption peak at the wave number of 852 cm$^{-1}$ of the third ellipse is derived from the stretching vibration of La—OH. The adsorption peak at the wave number of 648 cm$^{-1}$ of the fourth ellipse is derived from the stretching vibration of La—O. In addition, some characteristic adsorption peaks of WB are attributed to the stretching vibration of OH in $H_2O$ at 3420 cm$^{-1}$, and attributed to the stretching vibration of CH at the 2924 cm$^{-1}$ and 2860 cm$^{-1}$, and the characteristic peaks of 1600 cm$^{-1}$ are attributed to the stretching vibration of C=O. The analysis of the above results shows that $La(OH)_3$ is successfully loaded on the surface of the biochar, but because the sample is prepared in the air, part of $La(OH)_3$ may absorb $CO_2$ and convert it into $La_2(CO_3)_3$.

Figure 7:
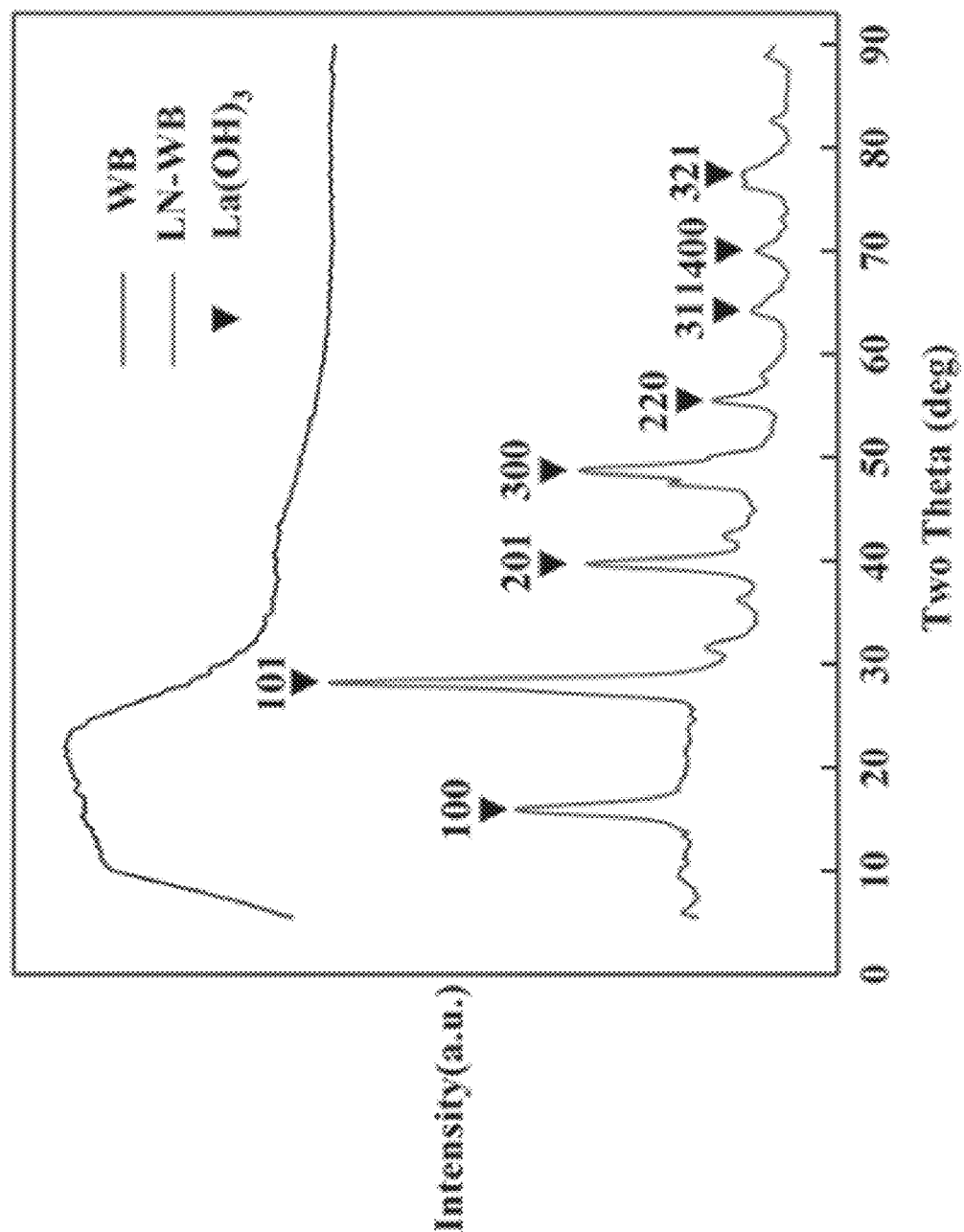
FIG. 7 is an XRD diagram of WB and LN-WB.

FIG. 7 is an XRD diagram of WB and LN-WB. WB has no characteristic adsorption peak, which indicates that WB is an amorphous substance. The adsorption peak of LN-WB is analyzed by jade 6.0, which shows that the phase is mainly hexagonal $La(OH)_3$ (PDF card number 36-1481), and the mass content in the crystal phase is about 95%.

4. Adsorption Kinetics

Figure 8A:
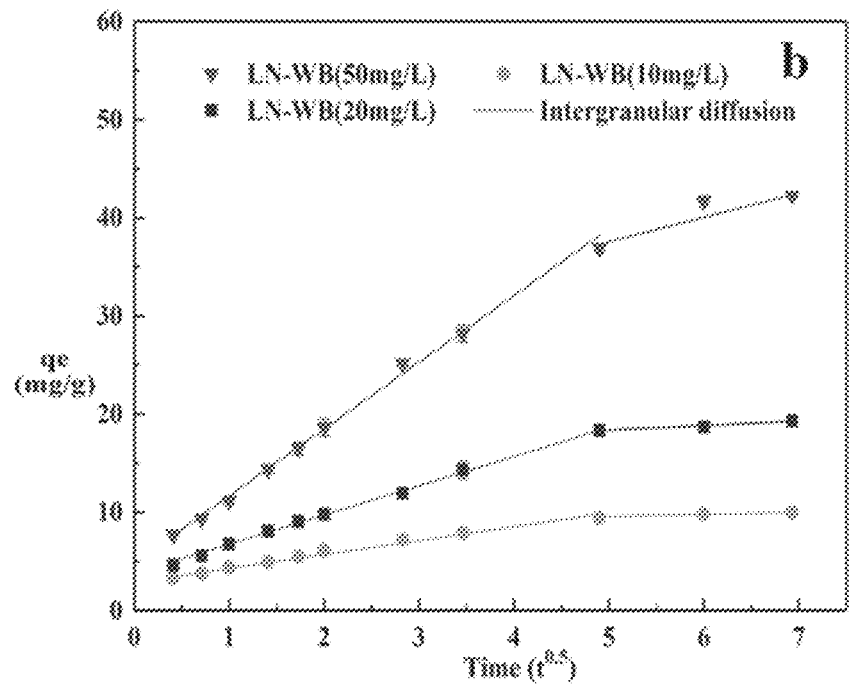
FIG. 8*a* shows pseudo-first-order and pseudo-second-order equation fitting curves.
Figure 8B:
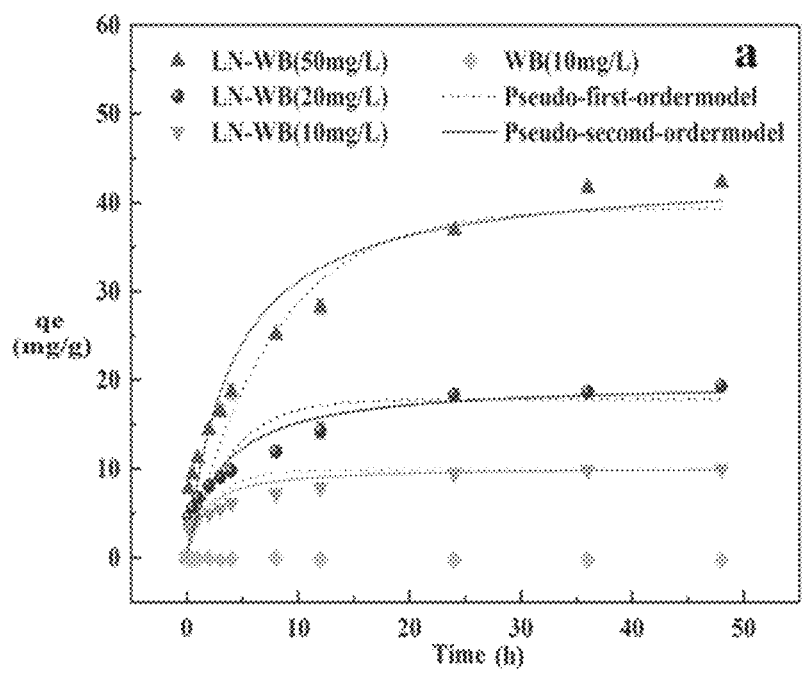
FIG. 8*b* shows fitting curves of internal diffusion equations (reaction conditions: the amount of adsorbent is 1 g/L, the shaking speed is 120 r/min, the temperature is 25° C., and the reaction time 0.17-48 h)

The adsorption capacities of WB and LN-WB for phosphorus are changed with time as shown in FIG. 8. Under the test conditions, WB has no adsorption capacity for phosphorus, but releases the phosphorus carried by WB into the solution. The release amount after about 48 hours is about

TABLE 3

Specific Surface, Pore Size and Pore Volume of Biochar

| Biochar | C (%) | H (%) | O (%) | N (%) | $S_{BET}$ (m$^2$/g) | Pore size (nm) | Pore Volume (m$^3$/g) | $pH_{PZC}$ |
|---|---|---|---|---|---|---|---|---|
| WB | 70.87 | 6.30 | 19.33 | 0.40 | 2.7662 | 62.7961 | 0.0019 | 4.21 |
| LN-WB | 39.95 | 2.10 | 20.96 | 0.13 | 50.6009 | 16.8557 | 0.2362 | 6.03 |

2. SEM and TEM Analysis

Figure 4:
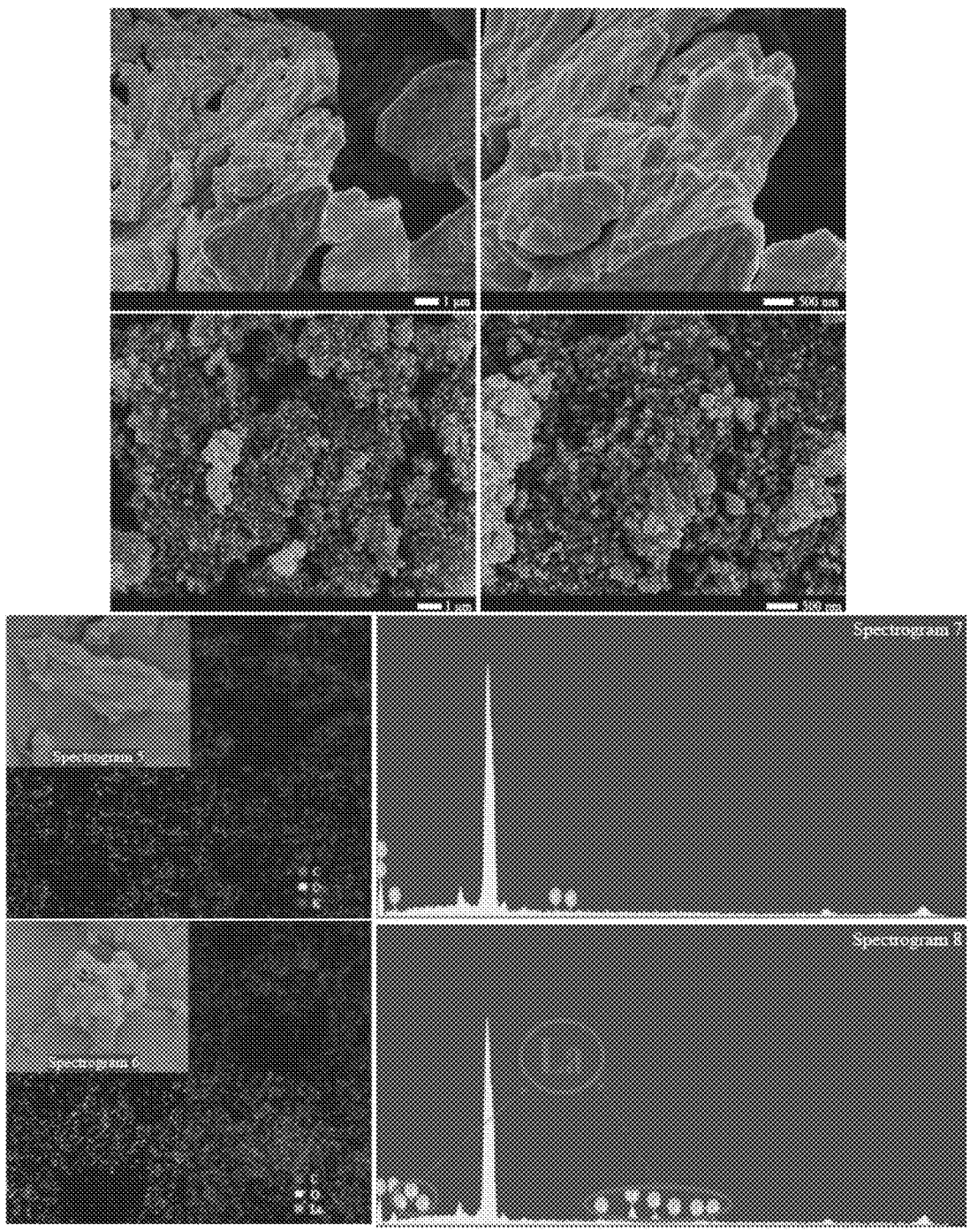
FIG. 4 is an SEM-EDS diagram of WB and LN-WB.
Figure 5:
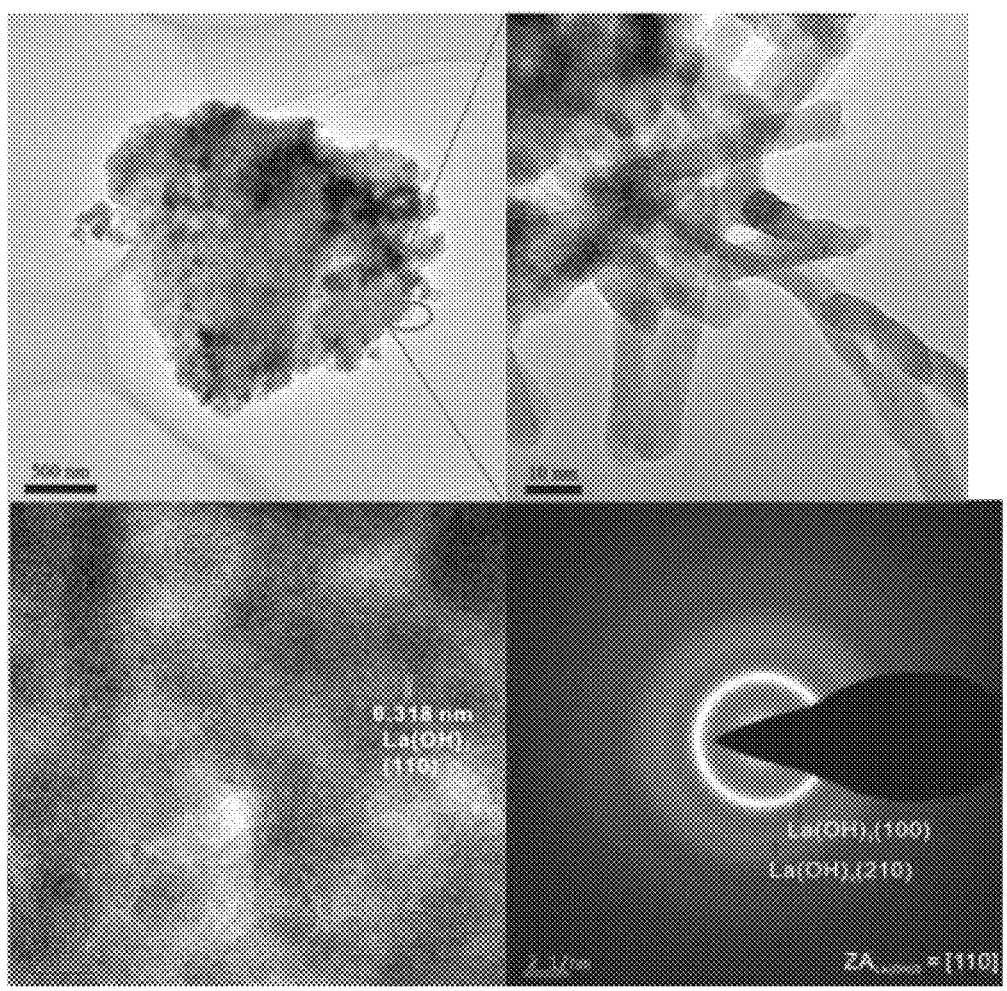
FIG. 5 is a TEM diagram of LN-WB.

As shown in FIG. 4, the WB surface is smooth and the texture is similar to clouds. After $La(OH)_3$ is loaded, the WB surface is completely covered by $La(OH)_3$ particles. FIG. 5 is a high-resolution TEM image of LN-WB. La active components are mainly loaded on the surface of biochar in the form of rods, and extend to the space at the edges. In the high-resolution lattice fringe phase, an interplanar spacing d=0.318 nm corresponds to the (101) plane of the hexagonal $La(OH)_3$ (PDF #36-1481). The conclusion is consistent with the XRD analysis result. Selected area electron diffraction patterns are multiple rings, which indicates that polycrystalline substances are formed, and the radiuses of the diffraction rings can respectively correspond to (100) and (210) crystal planes of the hexagonal $La(OH)_3$.

3. FTIR and XRD Analysis

Figure 6:
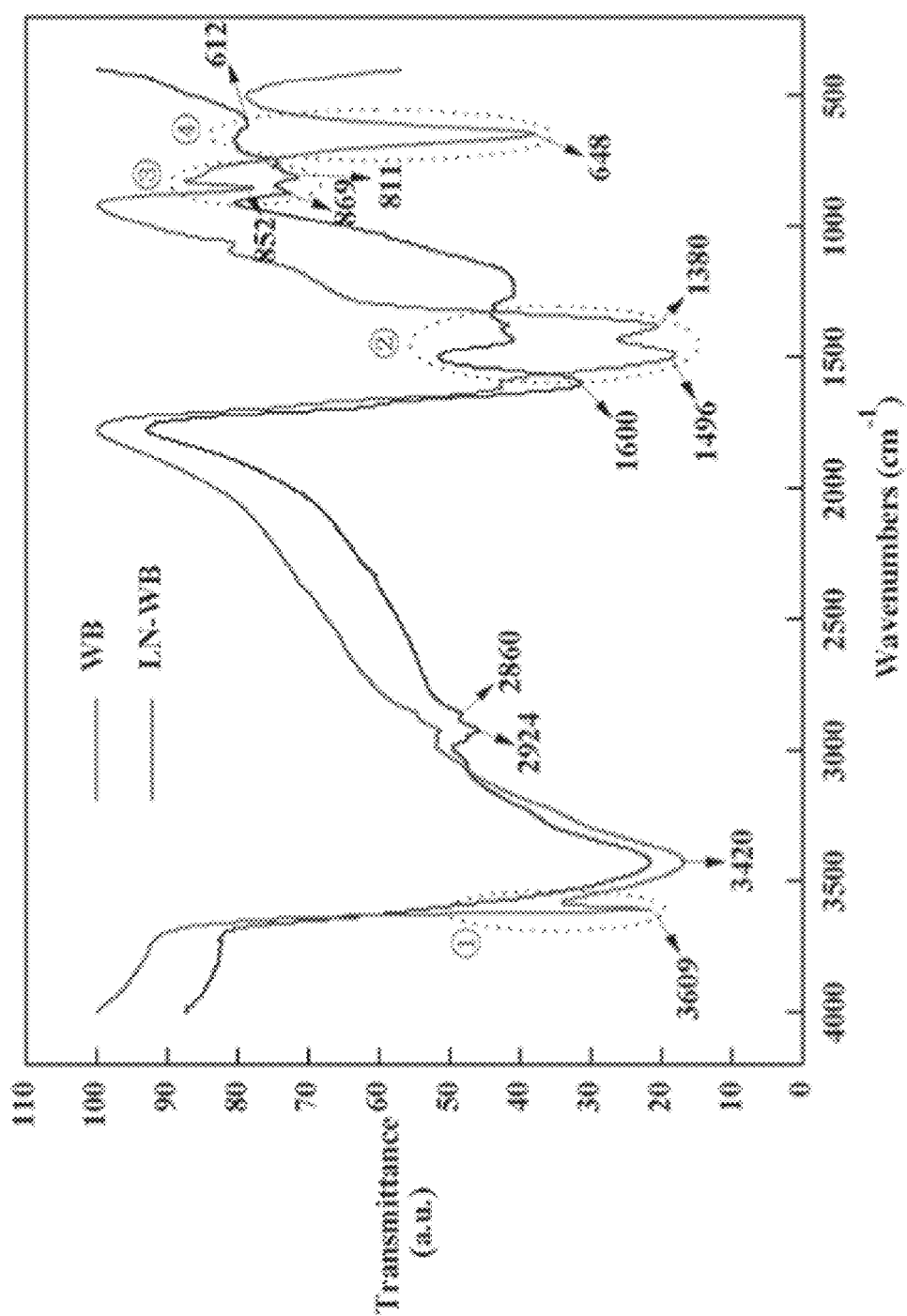
FIG. 6 is an FTIR diagram of WB and LN-WB.

FIG. 6 is an FTIR diagram of WB and LN-WB. WB and LN-WB adsorption peaks have obvious differences in the characteristic adsorption peaks at the four positions, as shown by the ellipse in the diagram. The adsorption peak at the wave number of 3609 cm$^{-1}$ of the first ellipse is derived 0.28 mg/g. In order to study the kinetic adsorption characteristics of phosphate by LN-WB, pseudo-first-order and pseudo-second-order kinetic equations are used to simulate the adsorption process of phosphate radical by LN-WB under different phosphate concentrations. The test data is fitted by equations (1) and (2), and the results are shown in Table 4. At different phosphorus concentration levels, the fitting results of pseudo-second-order kinetics are better than those of pseudo-first-order kinetics, which indicates that the adsorption of phosphate by LN-WB is mainly controlled by the chemical adsorption process.

In order to further determine the actual speed control steps in the test, an internal diffusion equation (3) is used to fit the test data. At different concentrations of phosphate levels, the fitted straight reverse extension lines do not pass the origin, which indicates that internal diffusion is not the only rate control step. However, the fitting curve can be divided into two parts, which indicates that the adsorption of phosphate by LN-WB is a multi-order adsorption process. In the adsorption of all phosphorus concentration levels by LN-WB, $k_1$ is greater than $k_2$ and $c_1$ is less than $c_2$, indicating that the first-stage rate is greater than the second-stage rate. This phenomenon can be explained as follows: at the beginning, the concentration difference is large, and there are many active sites on the surface of the adsorbent. As the adsorption time increases, the concentration difference is gradually decreased; the surface of the adsorbent becomes saturated; the adsorption capacity of the adsorbent gradually loses; and the adsorption rate is mainly controlled by the diffusion resistance within the particles.

Pseudo-first-order kinetic equation:

$$q_t = q_e(1 - e^{-k_1 t}) \quad (1)$$

Pseudo-second-order kinetic equation:

$$q_t = \frac{q_e^2 k_2 t}{1 + q_e k_2 t} \quad (2)$$

Intraparticle diffusion equation:

$$q_t = k_{di} t^{1/2} c_1 \quad (3)$$

In the equations: $q_t$ is the adsorption volume of phosphorus at time t, mg/g; $q_e$ is the adsorption volume of phosphorus at adsorption equilibrium, mg/g; $k_1$ is a first-order rate constant, $h^{-1}$; $k_2$ is a second-order rate constant, g/mg·h; $k_{di}$ is the intraparticle diffusion rate constant, mg/(g·$h^{1/2}$); and $c_1$ is the intraparticle diffusion constant, mg/g.

adsorption capacity of LN-WB, which indicates that the La utilization efficiency is lower than that of LN-WB. In the La-modified biochar material, the P/La molar ratio of La—RHBC$_9$ is 1.59, which is slightly higher than that of LN-WB. However, in order to obtain an excellent mesoporous biochar matrix, the pyrolysis temperature of the material is 800° C., and $CO_2$ is used to activate the biochar in the preparation process. High temperature of pyrolysis may lead to a sharp decline in biochar yield, and the use of $CO_2$ for activation may also increase the production cost. In another aspect, in the preparation of LN-WB, the mass ratio of raw materials to La is the same as LPC@(OH)$_3$, but the adsorption capacity of LN-WB is higher than LPC@(OH)$_3$. This may be caused by two reasons. The high temperature of pyrolysis is conducive to the development of micropores of the biochar to obtain biochar with a large specific surface area. However, for metal loading, a developed microporous system may not be advantageous, because in the process of metal loading, the precipitated metal will fill the micropores, resulting in the decrease in metal utilization efficiency when phosphorus is adsorbed. Secondly, LPC@(OH)$_3$ is prepared by a single-drop method. In this study, a two-drop method is used. A more uniform particle system is obtained by using the two-drop method. However, the study that compares La—RHBC$_9$ and LPC@(OH)$_3$ shows that when the pores of the biochar matrix are more developed, the La addition amount can be reduced to achieve a higher P/La molar ratio,

TABLE 4

| Adsorption Kinetic Parameters of Phosphate by LN-WB | | | | | | |
|---|---|---|---|---|---|---|
| Phosphorus concentration | Pseudo-first-order kinetic model | | | Pseudo-second-order kinetic model | | |
| (mg/L) | $K_1(h^{-1})$ | $q_e$(mg g$^{-1}$) | $R^2$ | $K_2$(g mg$^{-1}$ h$^{-1}$) | $q_e$(mg g$^{-1}$) | $R^2$ |
| 10 | 0.4173 | 9.89 | 0.9433 | 0.0642 | 10.22 | 0.9680 |
| 20 | 0.2676 | 17.81 | 0.9588 | 0.0165 | 19.82 | 0.9786 |
| 50 | 0.1768 | 40.34 | 0.9202 | 0.0103 | 41.10 | 0.9462 |
| Intraparticle diffusion model | | | | | | |
| Phosphorus concentration (mg/L) | $K_{d1}$(mg g$^{-1}$ h$^{-1/2}$) | $C_1$ | $R^2$ | $K_{d2}$(mg g$^{-1}$ h$^{-1/2}$) | $C_2$ | $R^2$ |
| 10 | 1.4185 | 2.8741 | 0.9849 | 0.2060 | 8.5445 | 0.9126 |
| 20 | 2.9709 | 3.7961 | 0.9974 | 0.4649 | 16.0574 | 0.9295 |
| 50 | 6.8041 | 4.8832 | 0.9958 | 2.4766 | 25.1915 | 0.8534 |

5. Adsorption Isotherm

Figure 9:
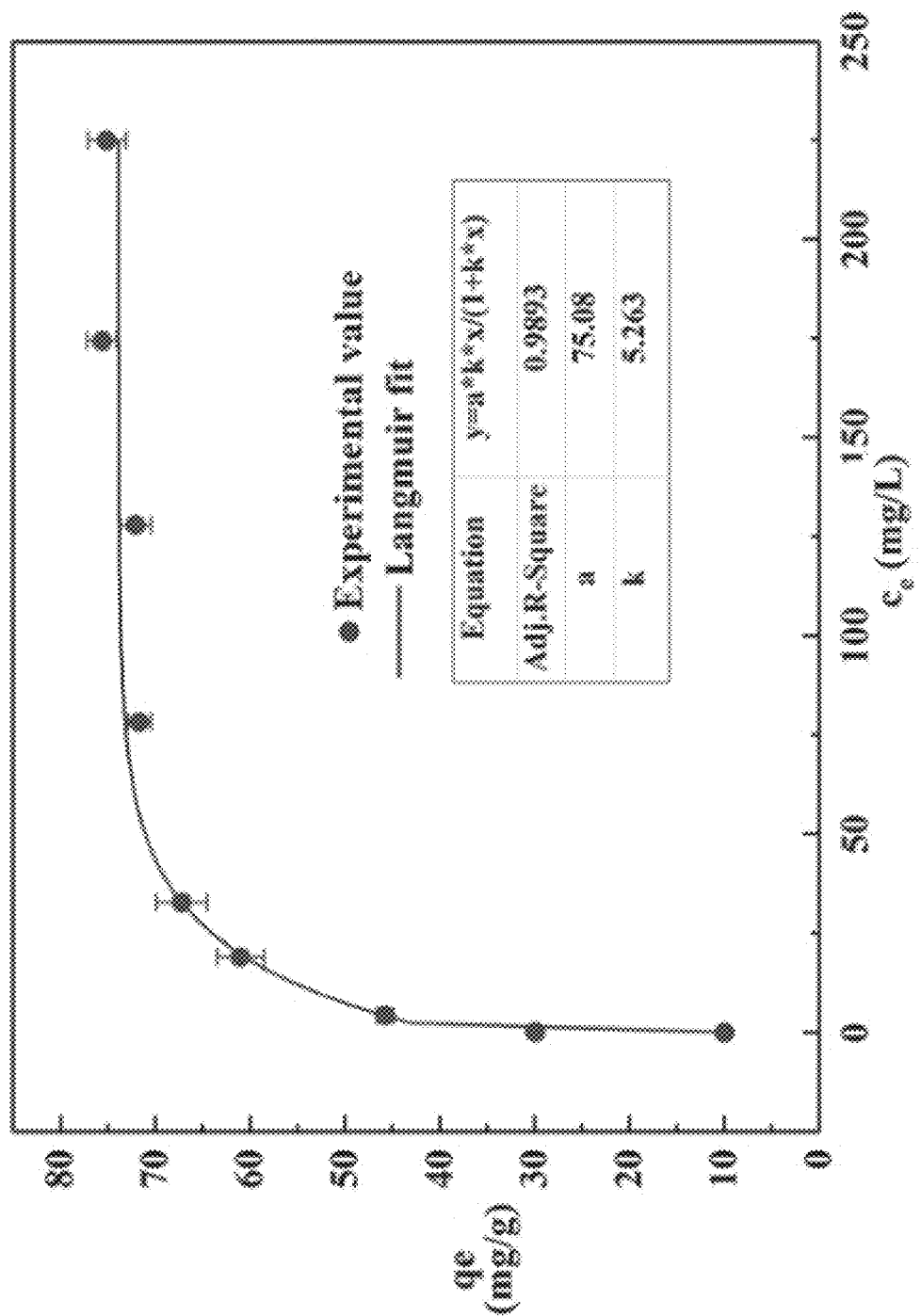
FIG. 9 is an isothermal adsorption curve.

In order to evaluate the maximum adsorption capacity of LN-WB for phosphate, Langmuir equation is used to fit the test data, and the results are shown in FIG. 9. The Langmuir equation fits the test data well; the correlation coefficient $R^2$ is 0.9893; and the maximum adsorption capacity of Langmuir is 75.08 mg/g, which is close to a measured value, indicating the correctness of the model fitting. In order to facilitate comparison with the phosphorus adsorption capacity of other La-based adsorption materials, Table 5 lists the maximum adsorption capacity value obtained by fitting the Langmuir equation in other literature. It can be seen from the table that, LN-WB has outstanding advantages as a phosphate adsorbent. Compared with similar La-modified biochar materials, the adsorption capacity of LN-WB is inferior to that of La$_{10}$-MC. However, with the same mass of carbon matrix, La addition amount of La$_{10}$-MC is twice of LN-WB. However, La$_{10}$-MC does not obtain twice the adsorption capacity is decreased. Compared with other La-based adsorption materials, LN-WB can obtain a higher P/La molar ratio. It shows that it is reasonable to use biochar matrix loaded La(OH)$_3$ to remove phosphate from the water, and the utilization efficiency of La can be increased when the phosphorus is adsorbed.

Langmuir isothermal equation:

$$q_e = \frac{q_{max} K_L c_e}{1 + K_L c_e} \quad (4)$$

In the equation: $q_e$ is the adsorption capacity of phosphorus at equilibrium, mg/g; $q_{max}$ is the Langmuir maximum adsorption capacity, mg/g; $K_L$ is the Langmuir equilibrium constant, L/mg; and $c_e$ is the mass concentration of phosphorus at equilibrium, mg/L.

TABLE 5

Comparison of Adsorption Capacity of La-based Adsorption Materials

| Adsorbent | Pyrolysis temperature (° C.) | Sbet (m2 g$^{-1}$) | Mass ratio of raw materials to La (w$_0$/w La) | La content (wt %) | P/La molar ratio | Adsorption capacity (mg-P g$^{-1}$) | Literature source |
|---|---|---|---|---|---|---|---|
| La-500 | 500 | Nd | 2.88 | Nd | Nd | 46.57 | (Wang et al. 2015) |
| La-BC | 500 | 45.79 | 2.17 | Nd | Nd | 46.37 | (Wang et al. 2016) |
| La$_{0.1}$-PC | 400 | 308.9 | 12.95 | 6.65 | 0.896 | 13.3 | (Koilraj et al. 2017) |
| La$_{10}$-MC | 300 | 84.89 | 0.72 | Nd | Nd | 101.16 | (Liao et al. 2018) |
| LPC@(OH)$_3$ | 700 | 473 | 1.44 | 28.72 | 0.94 | 60.24 | (Liu et al. 2018) |
| La-RHBC$_9$ | 800 | 455.7 | 5.0 | 12.85 | 1.59 | 45.62 | (Tang et al. 2019) |
| La- biochar | 491 | 8.11 | Nd | 12.1 | 1.34 | 36.06 | (Xu et al. 2019) |
| LN-WB | 400 | 50.60 | 1.44 | 26.59 | 1.27 | 75.08 | The present invention |
| Pho slock | Nd | Nd | Nd | 4.9 | 0.93 | 10.19 | (Haghseresht et al. 2009) |
| Prepared La(OH)$_3$ | Nd | 153.3 | Nd | 50.54 | 0.95 | 107.53 | (Xie et al. 2014) |
| Commercial La(OH)$_3$ | Nd | 31.1 | Nd | 73.32 | 0.34 | 55.56 | (Xie et al. 2014) |
| La(OH)$_3$ nanorod | Nd | Nd | Nd | 73.0 | 0.90 | 170.1 | (Fang et al. 2017) |

Remarks: Nd means that related data is not found.

6. Influence of pH on Adsorption Capacity

Figure 10:
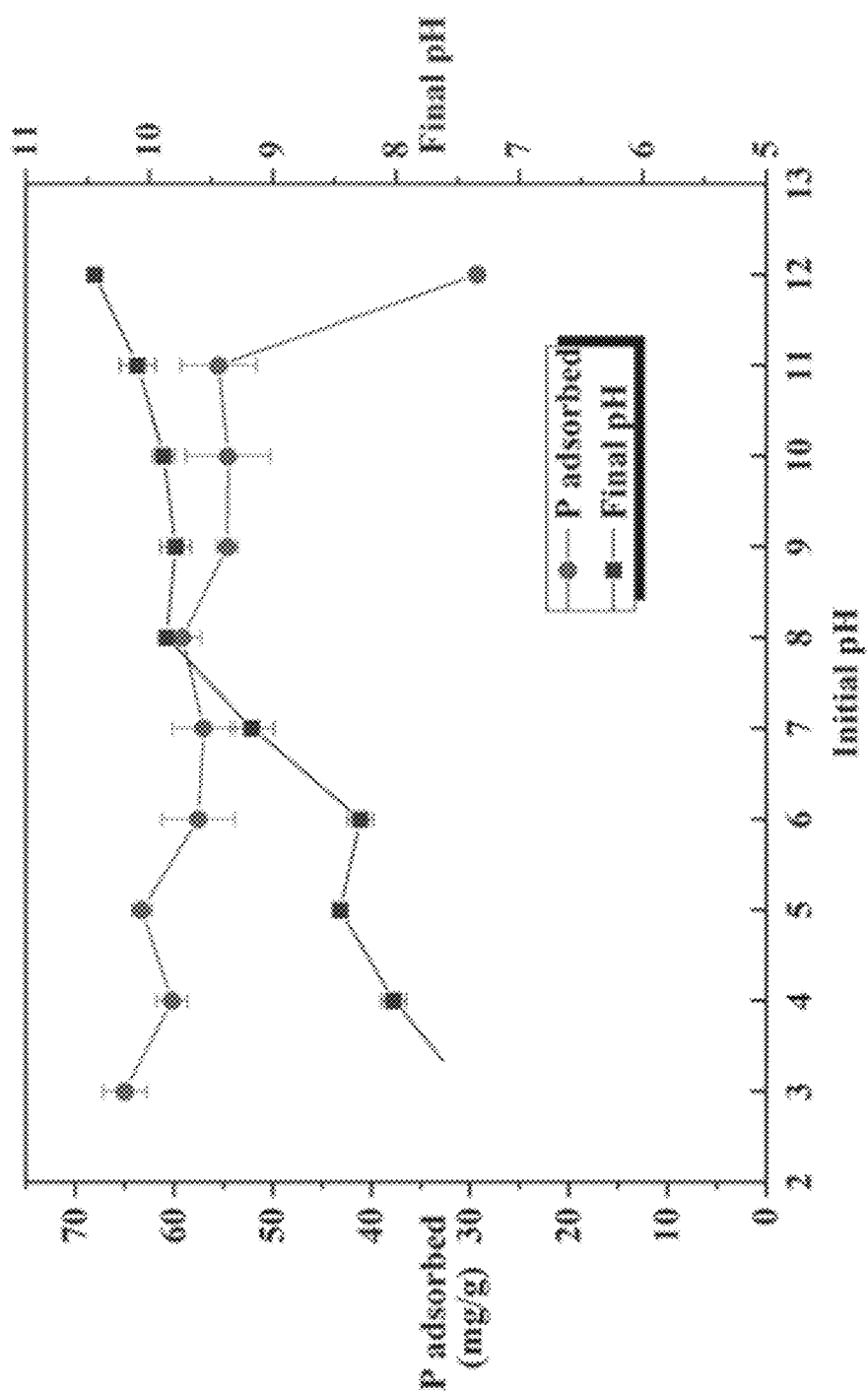
FIG. 10 shows the influence of initial pH of solution on adsorption volume.

FIG. 10 shows the change of the adsorption capacity with the increase of the initial pH of the phosphate solution. It can be seen that the initial pH of the phosphate solution is within the range of 3-11, and LN-WB shows high adsorption capacity for phosphate, and has adsorption capacity values higher than 55 mg-P/g, but when the pH is further increased to 12, the adsorption capacity of LN-WB for phosphate is decreased sharply. Compared with the pH of 3, the adsorption capacity value is decreased by about 54.97%. Compared with the pH of 11, the adsorption capacity value is decreased by about 47.23%. The change tendency of phosphate adsorption capacity with the increase of the pH is similar to that of some previous La-based adsorption materials. The influence of the pH on adsorption generally includes three aspects. Firstly, the pH will influence the ionization of the surface material of the adsorbent, thereby influencing the charging properties of the adsorbent material. Secondly, under high pH, —OH competes with phosphate ions for adsorbing the active sites on the surface of the material. In addition, the pH also influences the morphological distribution of the phosphate ions in the solution. In the current study of the La-based adsorption materials, positive ΔpH (ΔpH=equilibrium pH-initial pH) has been considered as an important phenomenon in a ligand exchange mechanism. When the pH of the solution is lower than the zero potential point of the adsorbent, electrostatic attraction and ligand exchange will serve as important mechanisms for the La-based adsorption materials to adsorb the phosphate radical. When the pH of the solution is too high, the electrostatic attraction will become electrostatic repulsion and the ligand exchange will be inhibited. At this time, the Lewis acid-base interaction will predominate in the adsorption, but the overall result is that the adsorption capacity is decreased. However, in this study, the adsorption mechanisms of LN-WB for the phosphate radical are mainly the electrostatic attraction and the ligand exchange. The decrease in the adsorption capacity at high pH is the result of weakening the two effects.

The above only describes preferred embodiments of the present invention. It should be noted that, for those ordinary skilled in the art, several variations and improvements can be made without departing from the concept of the present invention, and shall belong to the protection scope of the present invention.

What is claimed is:

1. A preparation method of La(OH)$_3$ nanorod coated walnut shell biochar composite, comprising the following steps:
   (1) putting walnut shell powder into a crucible and pyrolyzing and carbonizing in a muffle furnace at 350° C. to 450° C.;
   (2) after the pyrolysis is completed, grinding and sieving the obtained biochar, and then repeatedly washing with deionized water;
   (3) drying the washed biochar for later use;
   (4) putting an appropriate amount of biochar into the deionized water to form a turbid solution;
   (5) simultaneously dropwise adding LaCl$_3$ and NaOH to the above turbid solution by using a peristaltic pump;
   (6) allowing the obtained mixture to stand at room temperature for 20 to 30 h, washing and drying for later use.

2. The preparation method according to claim 1, wherein the concentration of the LaCl$_3$ solution is 0.3-0.6 mol/L, and the concentration of the NaOH solution is 1.0-2.0 mol/L.

3. The preparation method according to claim 1, wherein the pyrolysis and carbonization time is 1-3 h.

4. The preparation method according to claim 1, wherein the drying temperature in the step (3) is 100 to 110° C.

5. The preparation method according to claim 1, wherein the mass percentage of the biochar in the step (4) is 9% to 10%.

6. The preparation method according to claim 1, wherein the dripping speed of LaCl$_3$ and NaOH by the peristaltic pump in the step (5) is 1.5-2.0 mL/min.

* * * * *